UNITED STATES PATENT OFFICE.

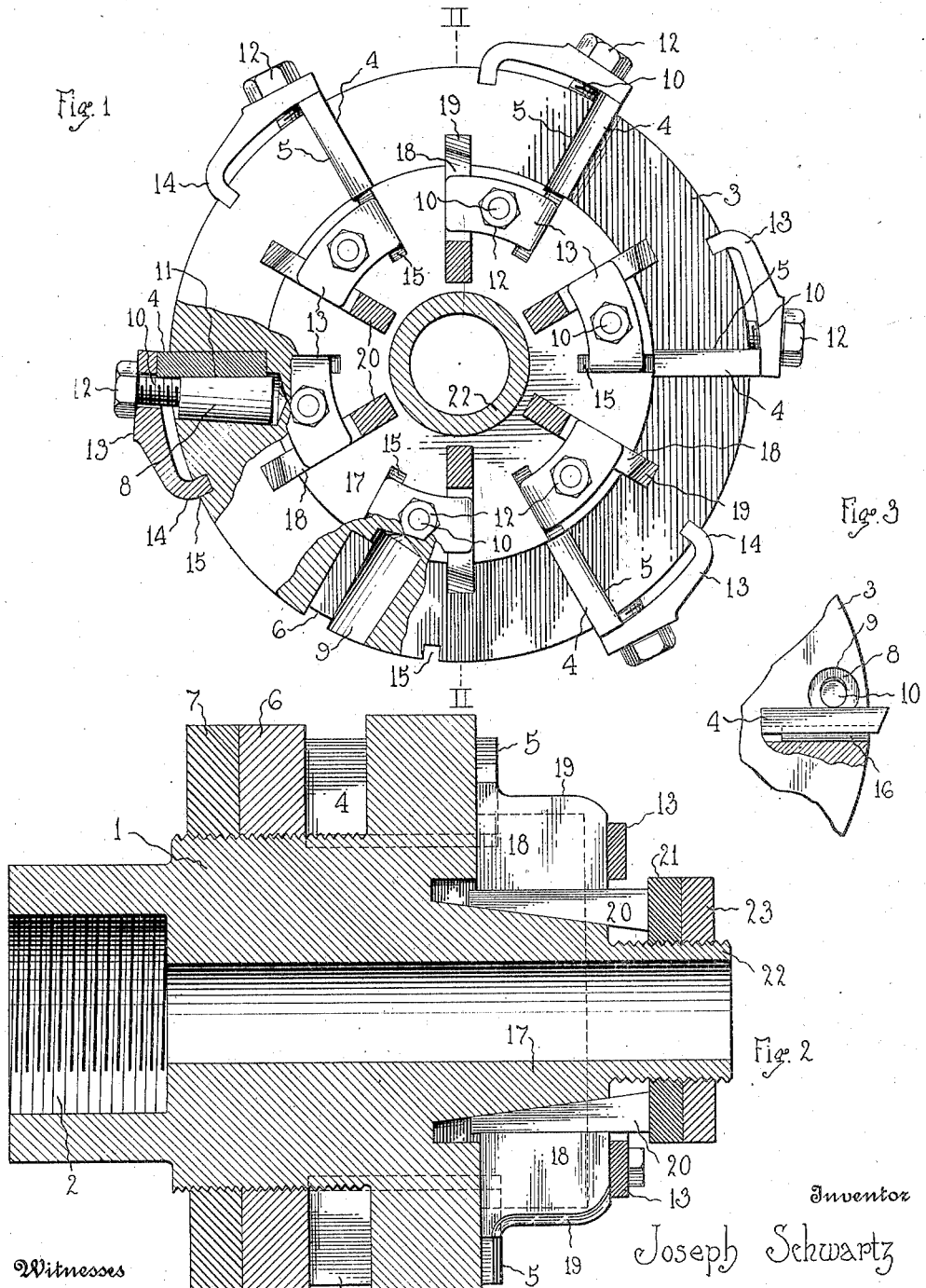

JOSEPH SCHWARTZ, OF DETROIT, MICHIGAN.

CUTTER-HEAD.

1,249,839.　　　　　Specification of Letters Patent.　　Patented Dec. 11, 1917.

Application filed March 29, 1917. Serial No. 158,144.

*To all whom it may concern:*

Be it known that I, JOSEPH SCHWARTZ, a citizen of the United States of America, residing at Detroit, in the county of Wayne and State of Michigan, have invented certain new and useful Improvements in Cutter-Heads, of which the following is a specification, reference being had therein to the accompanying drawings.

This invention relates to cutting, boring, reaming, or other forming tools having detachable and adjustable cutting blades comprising flat pieces of steel and an object of the invention is to provide means for securely holding these blades in place in such a manner that breakage is minimized and the blade may be quickly adjusted or removed.

A further object is to facilitate manufacture and cheapen the construction which is such as to adapt the same to the various forms of cutting or forming tools.

A further object of this invention is to provide an improved construction of cutter head and arrangement of cutter blades, whereby a continuous irregular surface may be formed and a cheap and efficient tool secured.

With these and other ends in view, the invention consists in the matters hereinafter more fully described and particularly pointed out in the appended claims, reference being had to the accompanying drawings in which—

Figure 1 is an end elevation of a cutter head illustrative of the invention and showing parts omitted and others broken away to more clearly illustrate the construction;

Fig. 2 is a central longitudinal section through the same, and

Fig. 3 is a detail showing a slightly modified construction.

For convenience of illustration, the invention is shown as embodied in a rotary forming tool for boring inside irregular surfaces, but it will be understood that certain features of the invention may be applied to other forms of cutters and the construction and arrangement of parts may be changed, within the scope of the appended claims, to suit the particular work to be done.

As shown in Figs. 1 and 2, a suitable head 1 is provided having an internally screw-threaded bore 2 at one end for the attachment of the device to a spindle or other rotary driving member of a machine and this head is also formed with a circumferential flange 3 having a series of slots cut therein to receive rectangular cutter blades or plates 4 having end cutting edges 5 to engage the work. These cutters 4 are backed up by a ring 6 upon a screw-threaded rear end portion of the head and engaged by a locking ring 7 so that by turning the ring 6 the cutters may all be moved longitudinally toward the work as they wear away in use.

To securely hold these cutters 4 against movement in their slots, wedge blocks or pins 8 are provided, one for each cutter to engage the forward side thereof in the direction of rotation. Each wedge pin is seated within a hole 9 which is bored inwardly of the flange 3 adjacent the slot for the cutter. These holes are bored before the slots are milled out and each slot is cut radially inward of the head with one side of each slot cutting into the bore or hole 9, which hole, when it is formed, is bored inwardly at a slight angle to a radial line of the head so that the axis of each hole is at a slight angle to the adjacent face of the slot with said face and bore diverging inwardly. Each wedge pin 8 is first formed cylindrical with a reduced and screw-threaded shank 10 at its outer end and then the side of the pin which is adapted to engage the face of the cutter, is milled off at an angle or incline corresponding to the angle at which the cutter sets in the head, that is, the contact face 11 of each wedge pin diverges from the axis of the pin toward the inner end of the pins, and thus when the pin and cutter are in place, the pin will exert a wedging or binding action on the side of the cutter when the pin is pulled outwardly in its bore by means of a nut 12 on the outer end of its shank engaging a clamp 13 interposed between the outer edge of the cutter and the nut, said clamp being formed with a hole through which the shank loosely passes. Each clamp has a tail piece 14 extending rearwardly and inbent to engage a notch 15 in the edge of the flange 3.

The cutters are thus firmly wedged laterally into their seats in the grooves and held against edgewise displacement. The clamps by being free on the shoulder of the pins and seated at one end on the chuck body or flange 3, have a leverage to strongly force the cutters edgewise and the tapering or wedge shaped pins exert a heavy pressure to firmly seat the cutters against the plane surface of one side of their grooves, and as the head as shown in the drawing is arranged to revolve counter-clockwise in cutting, the strain on the cutters forces them toward the plane surface which forms an even seat therefor throughout their length, and thus breakage of the cutters is minimized.

Where it is desired that a peripheral cut be made, as shown in Fig. 3, each cutter may be held against movement longitudinally of the head by forming each cutter with a transverse groove and also providing a corresponding groove in the plane seating surface of the slot in the head for the cutter. In these grooves is a pin 16 which, while preventing the cutter from moving in the direction of the length of its wedge pin 8 permits of ready adjustment of the cutter outwardly or radially as it wears away in use.

The cutter head or body 1 may be provided with an end extension 17 beyond the flange 3 and this extension may have longitudinal radially extending slots for other cutter plates 18 held in place thereon by wedge pins and clamps identical with those which are provided to hold the cutters 4, said cutters 18 having formed side edges 19 to give the desired form to the bore in the work. In this instance the bores for the wedge pins extend inward from the end of the head at an angle to the plane of the grooves for the cutters and the clamps held by the nuts on the shanks of said pins are applied to the ends of the cutters to prevent movement in a direction longitudinally of the head. These cutters 18 are set in staggered relation to the cutters 4 and thus the side surface formed by said cutters 18 forms a continuation of the end surface formed by the cutters 4. These cutters 18 are adjusted radially as these outer cutting edges wear away in use, by means of wedges 20 engaging in the bottoms of the slots for said cutters and these wedges are forced inwardly by means of a nut or ring 21 on an externally screw-threaded tubular extension 22 of the head. A lock nut 23 is provided for the nut 20.

A very simple and compact cutter head is thus secured for the purpose, which is cheap to manufacture and efficient in operation.

Having thus described my invention what I claim is:—

1. In a device of the character described, the combination of a body having a bore extending into the body and a slot cutting into one side of the bore, the axis of said bore and the plane of said slot diverging toward their inner closed ends, a cutter plate in the slot, a wedge member in the bore having a side to engage the cutter plate, and means for moving the wedge member outwardly in its bore relative to said plate, whereby said member is forced laterally against said plate.

2. In a device of the character described, the combination of a body formed with a hole extending into the body and a slot cutting into one side of the hole, the longitudinal plane of the hole and slot diverging toward the inner closed ends of the hole and slot, a cutter in the slot, and a tapered wedge member in the hole with its largest end toward the inner closed end of the hole, said member being adapted to engage said cutter when moved outward in the hole.

3. In a device of the character described, the combination of a body formed with an inwardly extending hole and a slot cutting in the hole, the hole and slot extending inward in divergent directions, a cutter plate in the slot, a wedge member in the hole having a side conforming to the adjacent side of the plate to engage the same, and means on the outer end of said wedge member to engage the edge of the plate projecting from the outer end of the slot.

4. In a device of the character described, the combination of a body formed with an inwardly extending and diverging hole and slot with the slot cutting into the side of the hole, a cutter plate in the slot and projecting therefrom, a wedge member in the hole having a tapering side to engage the side of the plate and provided with a screw-threaded end projecting from the hole, and a nut on said screw-threaded end to engage the outer end of the plate.

5. In a device of the character described, the combination of a circular head having radial slots therein and holes extending inwardly in divergent relation to said slots with a hole cutting into one side of each slot, a cutter plate in each slot projecting therefrom, a wedge member which is larger at its inner than at its outer end in each hole and having a projecting outer end, and a member on the outer end of each wedge member for moving said members outwardly in the holes.

6. In a device of the character described, the combination of a circular head having radial slots therein and holes extending inwardly in divergent relation to said slots with a hole cutting into one side of each slot, a cutter plate in each slot projecting therefrom, an outwardly tapered wedge member in each hole and having a reduced and screw-threaded outer end, a nut on said screw-threaded outer end, and members interposed between said nuts and the outer edges of said plates with an end of each member engaging the head, said head being formed with notches to receive said ends.

7. In a device of the character described, the combination of a cylindrical head having a flange provided with radial slots and an end portion formed with radial slots extending inward from said end and through the side thereof, the slots in the flange being in staggered relation to the slots in the end portion, and said head being provided with a bore cutting into one side of each slot with the axis of each bore in inwardly divergent relation to the plane of the adjacent slot, cutter plates in all of the said slots, wedge pins in said bores having flattened sides to engage the plates, means on the outer ends of the wedge pin for moving said pins outwardly in their bores, and means for adjusting said plates in their slots.

In testimony whereof I affix my signature in the presence of two witnesses.

JOSEPH SCHWARTZ.

Witnesses:
ANNA M. DORR,
G. E. McGRANN.

Copies of this patent may be obtained for five cents each, by addressing the "Commissioner of Patents, Washington, D. C."